(12) United States Patent
Vuk

(10) Patent No.: US 7,051,786 B2
(45) Date of Patent: May 30, 2006

(54) VERTICAL AIRFLOW ENGINE COOLING SYSTEM

(75) Inventor: Carl Thomas Vuk, Denver, IA (US)

(73) Assignee: Deere & Company, Moline, IL (US)

( * ) Notice: Subject to any disclaimer, the term of this patent is extended or adjusted under 35 U.S.C. 154(b) by 324 days.

(21) Appl. No.: 10/617,612

(22) Filed: Jul. 11, 2003

(65) Prior Publication Data

US 2005/0006048 A1 Jan. 13, 2005

(51) Int. Cl.
*B60K 11/00* (2006.01)
*B60H 1/00* (2006.01)

(52) U.S. Cl. ............................ 165/41; 165/43; 165/51; 165/122; 180/68.1; 180/68.6

(58) Field of Classification Search .................. 165/41, 165/42, 43, 51, 121, 122; 180/68.1, 68.4, 180/68.6; 123/41.12, 41.65, 41.66, 41.7
See application file for complete search history.

(56) References Cited

U.S. PATENT DOCUMENTS

| 2,316,619 | A | * | 4/1943 | Raney .......................... 237/2 A |
| 2,680,490 | A | * | 6/1954 | Dafoe ............................ 180/68.1 |
| 3,934,644 | A | | 1/1976 | Johnston ......................... 165/51 |
| 4,362,208 | A | | 12/1982 | Hauser ........................... 165/51 |
| 4,432,309 | A | * | 2/1984 | Hutchison et al. ............ 123/41.66 |
| 4,590,891 | A | * | 5/1986 | Fujikawa et al. ............. 180/68.4 |
| 4,691,668 | A | * | 9/1987 | West ............................ 123/41.12 |
| 4,696,361 | A | * | 9/1987 | Clark et al. ...................... 165/41 |
| 4,862,981 | A | * | 9/1989 | Fujikawa et al. ............ 180/68.4 |
| 4,991,940 | A | * | 2/1991 | Dalisa et al. .................. 349/113 |
| 5,113,819 | A | * | 5/1992 | Murakawa et al. ........... 180/68.1 |
| 5,207,187 | A | * | 5/1993 | Kurohara et al. ............. 180/68.1 |
| 5,284,115 | A | * | 2/1994 | Imanishi et al. .............. 123/41.7 |
| 5,689,953 | A | * | 11/1997 | Yamashita et al. ............. 60/316 |
| 5,960,899 | A | | 10/1999 | Roach ........................... 180/68.4 |
| 6,105,349 | A | * | 8/2000 | Busboom et al. ............. 180/68.6 |
| 6,167,976 | B1 | * | 1/2001 | O'Neill et al. ................ 180/68.1 |
| 6,401,801 | B1 | * | 6/2002 | Dicke ............................ 165/41 |
| 6,616,411 | B1 | * | 9/2003 | Sheidler et al. ............... 416/237 |
| 6,634,448 | B1 | * | 10/2003 | Bland ........................... 180/68.1 |

\* cited by examiner

Primary Examiner—Ljiljana Ciric

(57) ABSTRACT

A non-rail off-road vehicle, such as an agricultural tractor having an engine with a horizontally oriented rotation axis and a hood covering the engine, includes a cooling system. The cooling system includes an engine cooling radiator positioned above the engine and between the engine and the hood and a fan unit with electric motor-driven fans blowing air upwardly through the radiator. The fan unit is positioned above the engine and between the engine and the radiator. An engine charge air cooler is also positioned above the engine and between the engine and the hood, and a charge air cooler fan unit has electric motor-driven fans which blow air upwardly through the cooler. The hood has openings in its upper surface through which passes air blown by the radiator fan unit and the charge air cooler fan unit. This cooling system blows heated cooling air vertically upwardly, thus preventing the heated cooling air from being drawn back into the intakes of the cooling system and preventing heated air from being blown onto the exterior of the tractor cab.

9 Claims, 6 Drawing Sheets

VERTICAL AIRFLOW ENGINE COOLING SYSTEM

BACKGROUND

The present invention relates to a cooling system for an engine powered non-rail off-road work vehicle such as an agricultural tractor.

Current tractor cooling systems have components, such as a fan and a water pump which are mechanically driven by the engine. The mechanical drive limits the location of such components to on or near a rotation axis and at the front of the engine. A large amount of mechanical engine power is consumed in driving the fan. This degrades vehicle performance and fuel economy and results in high noise levels. Such tractor cooling systems also take up a lot of space in areas that interfere with the operator's view in the forward direction. Such cooling systems may also blow heated air back toward the cab, thus heating the cab substantially, and increasing the heat load on the cab cooling and air conditioning system. In certain conditions, such as a tail wind, the hot air blown by such cooling systems may, instead of exiting the region of the tractor, be recirculated or drawn back into the radiator. Cooling system capacity must be increased to handle this effect. A more efficient cooling system which avoids hot air recirculation is desired.

A diesel-electric railway locomotive design is known wherein the engine is located behind the locomotive cab and a cooling unit is spaced apart from and behind the engine. The cooling unit includes a number of radiators and electric motor-driven 2-speed fans. However, in most off-road vehicles, such as agricultural tractors, there is insufficient fore-and-aft room for such an arrangement of components, and there has not previously been sufficient electrical power capacity to power electric motor-driven cooling fans.

SUMMARY

Accordingly, an object of this invention is to provide a cooling system for an off-road vehicle which avoids recirculation of hot air by the cooling system.

A further object of the invention is to provide such a cooling system which takes advantage of the capabilities of electric motor-driven cooling fans.

A further object of the invention is to provide such a cooling system which does not blow heated air rearwardly towards the vehicle cab.

These and other objects are achieved by the present invention, wherein a cooling system is provided for a non-rail off-road vehicle having an engine with a horizontally oriented rotation axis and a hood covering the engine. The cooling system includes an engine cooling radiator positioned above the engine and between the engine and the hood and a fan unit with electric motor-driven fans blowing air upwardly through the radiator. The fan unit is positioned above the engine and between the engine and the radiator. An engine charge air cooler is also positioned above the engine and between the engine and the hood, and a charge air cooler fan unit has electric motor-driven fans which blow air upwardly through the cooler. The hood has a plurality of openings in an upper surface thereof through which passes air blown by the radiator fan unit and the charge air cooler fan unit. This cooling system blows heated cooling air vertically upwardly, thus preventing the heated cooling air from being drawn back into the intakes of the cooling system and preventing heated air from being blown onto the exterior of the vehicle cab.

DETAILED DESCRIPTION

Figure 1:
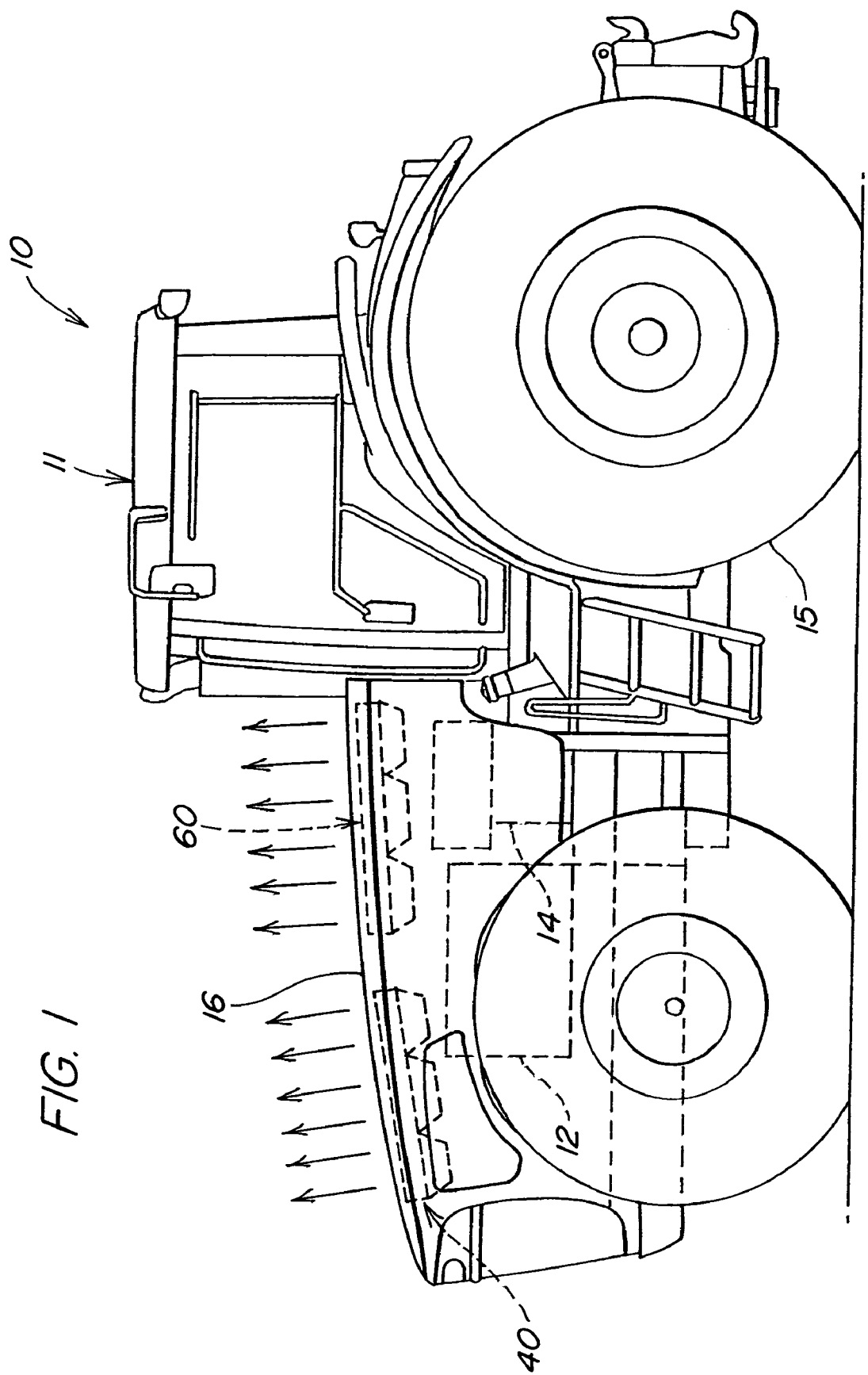
FIG. 1 is a simplified schematic illustration of a vehicle with a cooling system according to the present invention.

Referring to FIG. 1, a steerable, non-rail, off-road vehicle 10 (such as an agricultural tractor) includes a cab 11, an internal combustion engine 12, a transmission 14 for mechanically driving wheels 15, and a hood 16. Mounted under the hood 16 and above the engine 12 is an engine cooling radiator 40 and a charge air cooling unit 60.

Figure 2:
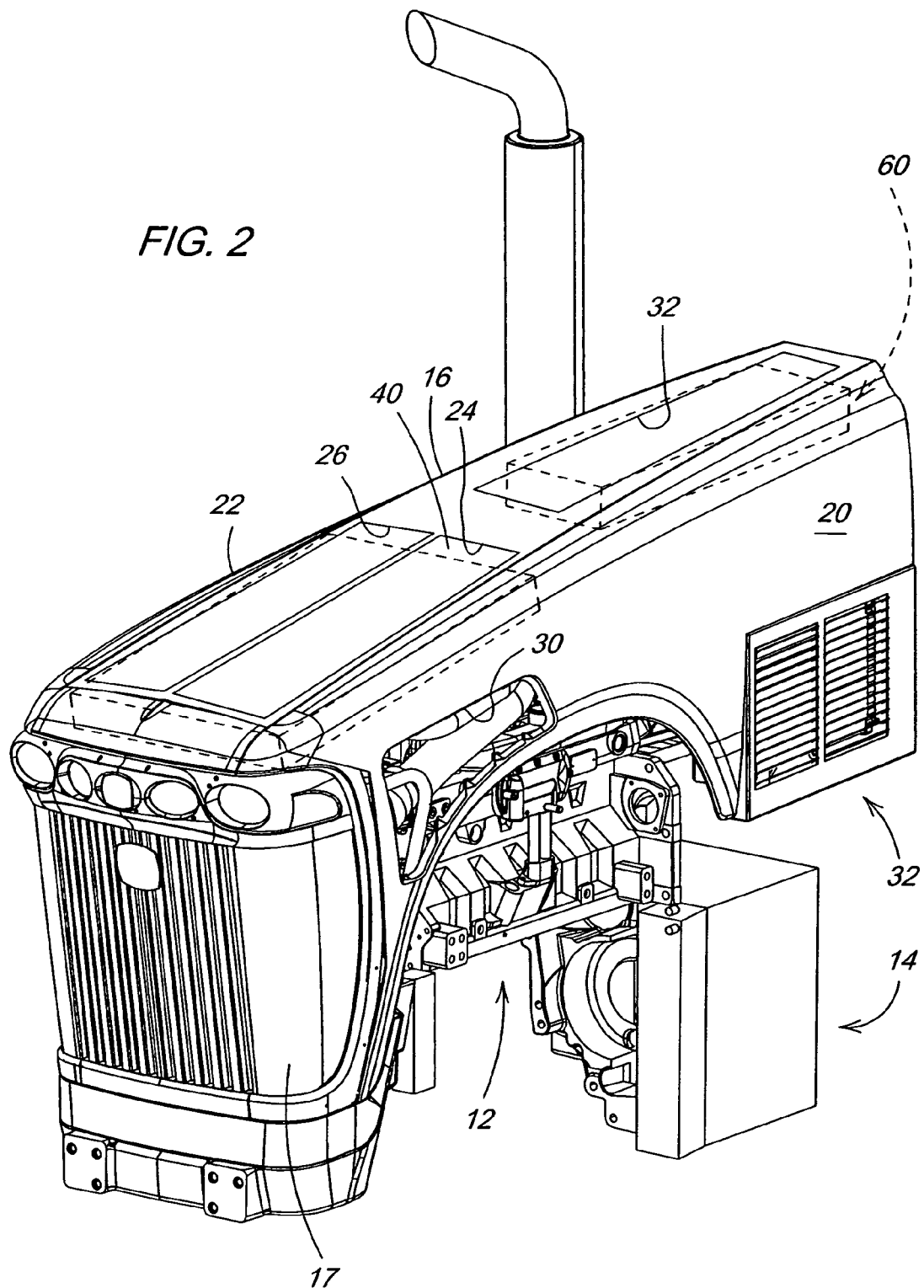
FIG. 2 is a perspective view of the front portion of a vehicle with a cooling system according to the present invention.

Referring to FIG. 2, a front grill 17 is at the front of the hood 16. The hood 16 has an upper panel 18 and left and right side panels 20, 22 (of which substantially only panel 20 is visible in FIG. 2). Upper panel 18 includes a pair of front openings 24, 26 and a rear opening 28. Side panel 20 includes a forward inlet opening 30, a rear inlet opening 32 and a wheel/axle recess 34. The engine 12 includes a turbo-compressor 33 which receives intake air from air cleaner 35.

Figure 3:
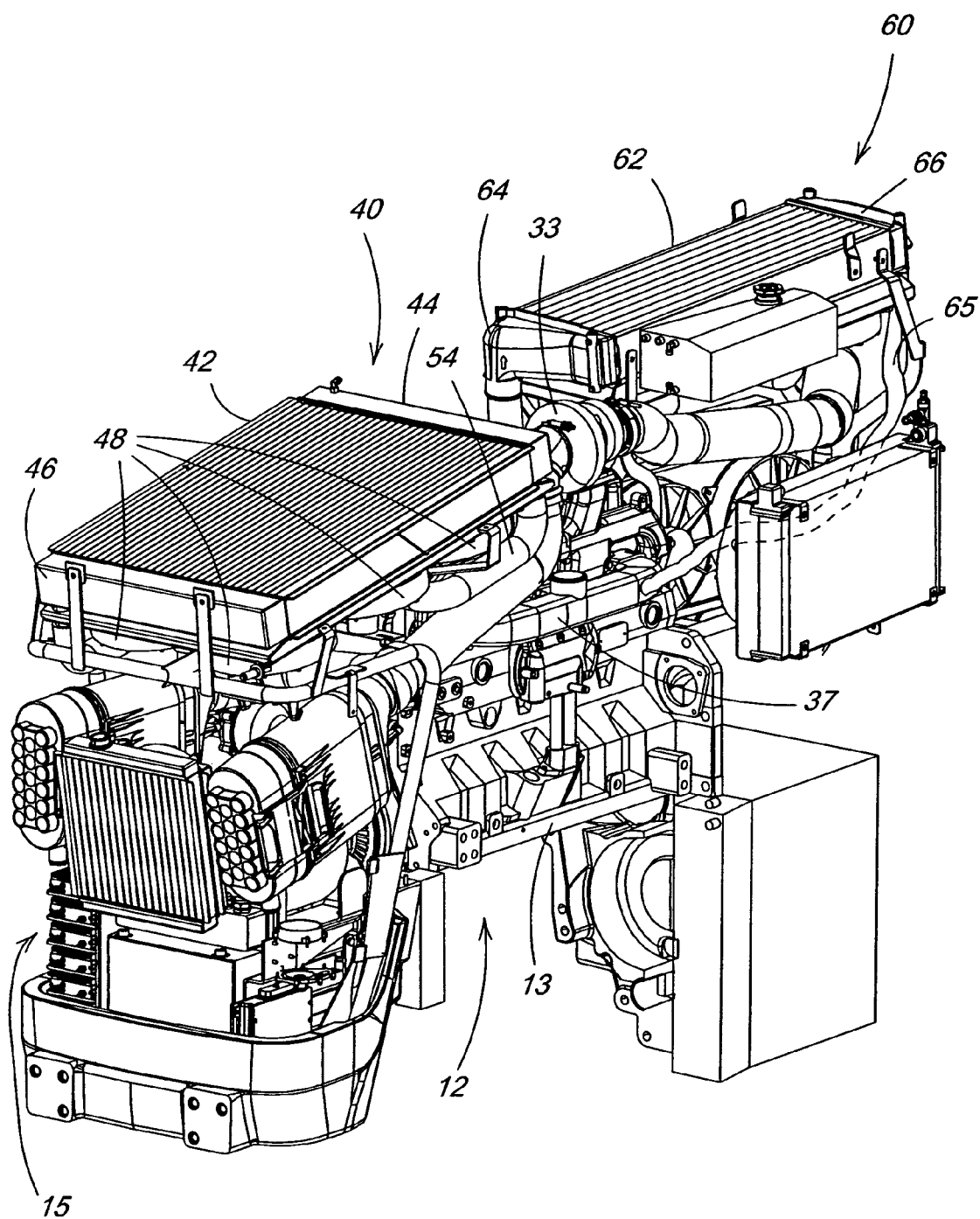
FIG. 3 is a perspective view of a vehicle cooling system similar to FIG. 1, but with the hood removed.
Figure 4:
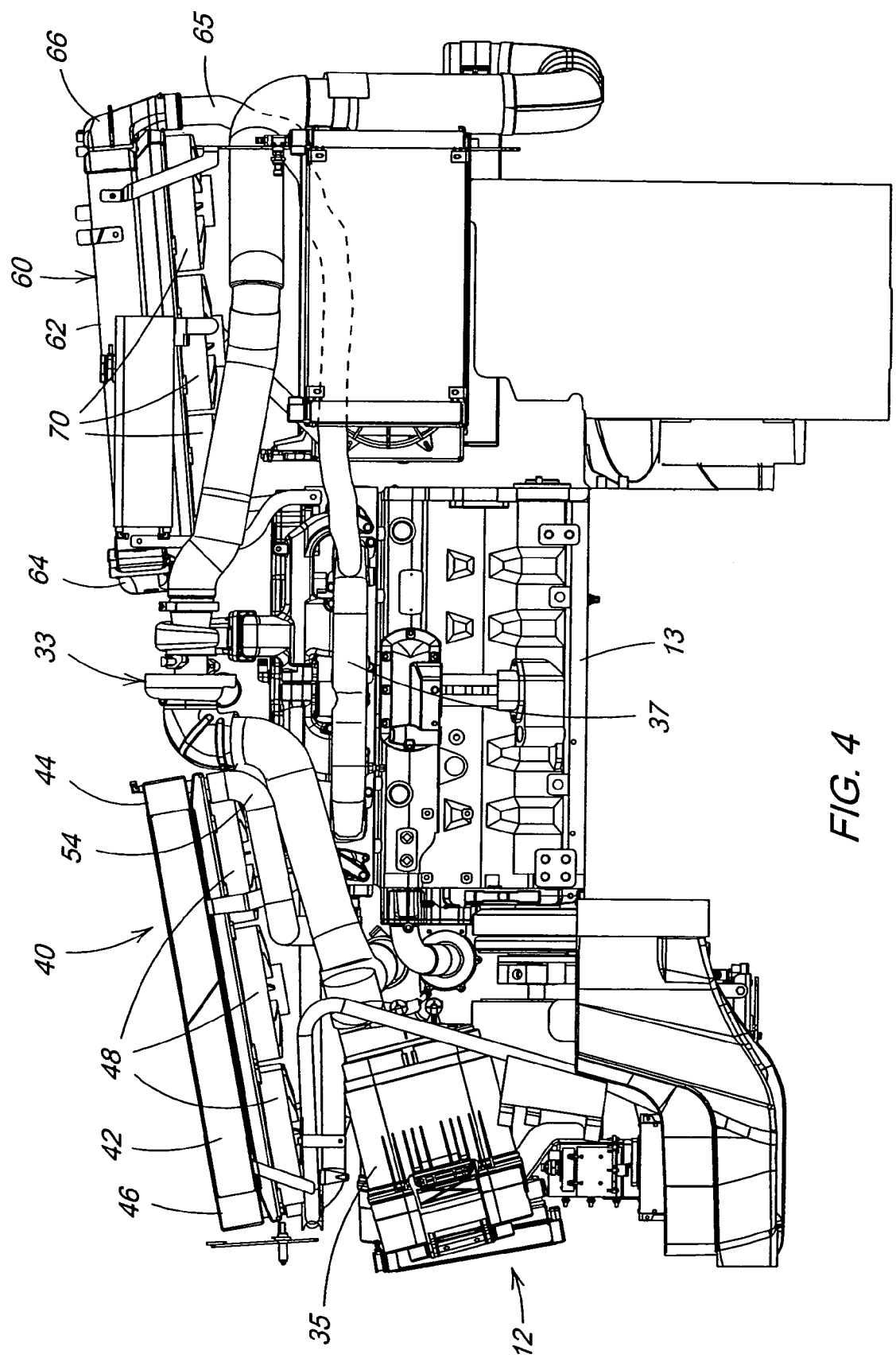
FIG. 4 is a left side view of a vehicle cooling system according to the present invention with the hood removed.
Figure 5:
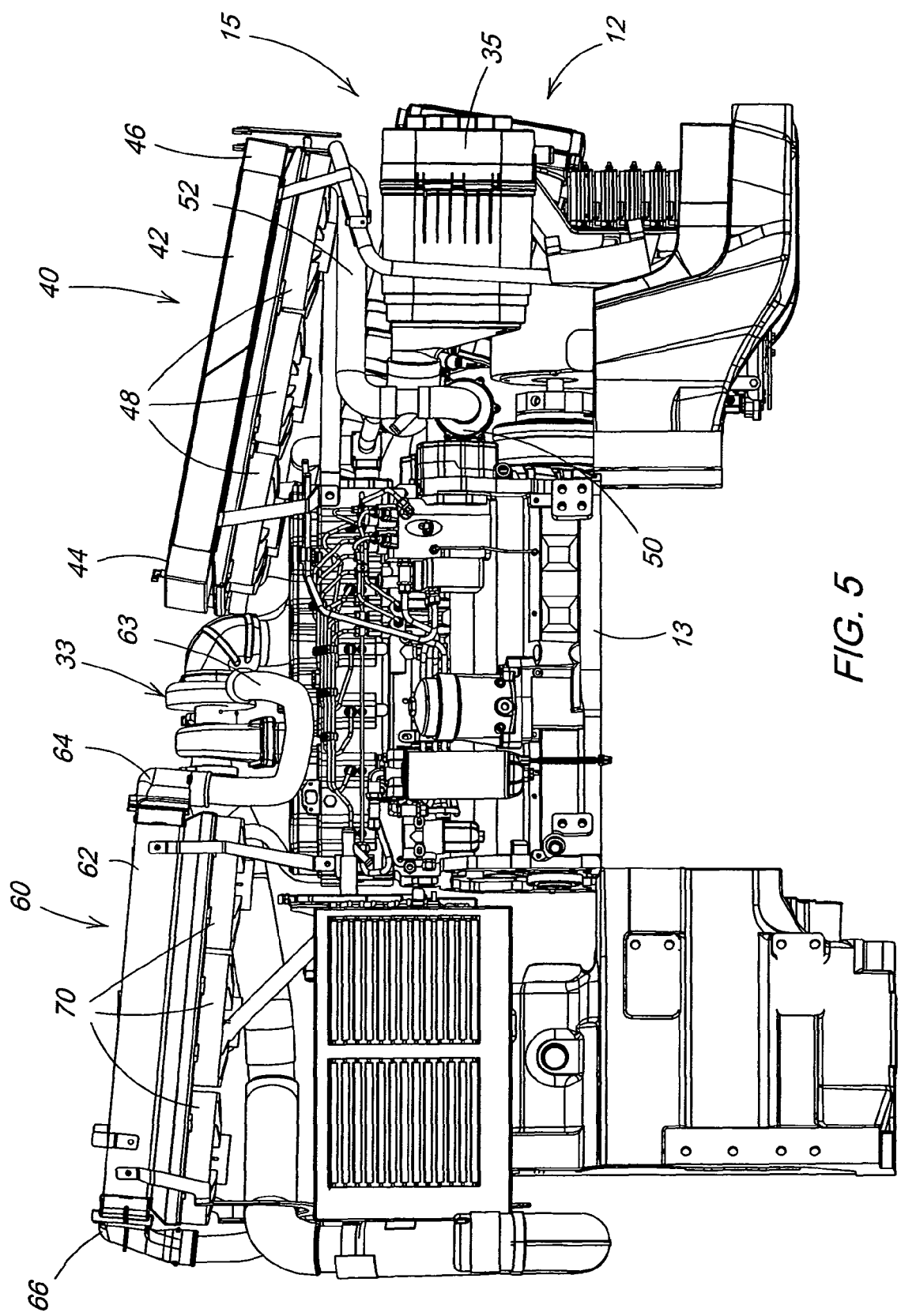
FIG. 5 is a right side view of a vehicle cooling system according to the present invention with the hood removed.

As best seen in FIGS. 3, 4 and 5, the engine 12 includes an internal combustion unit 12A and accessories 12B. The engine cooling radiator 40 is mounted above engine 12. Radiator 40 includes a heat exchange unit 42 between an upper tank 44 and a lower tank 46. A plurality (such as 6) of electric motor driven fans 48 are attached to the underside of the radiator 40 substantially between the engine 12 and the radiator 40. Fans 48 are preferably driven to blow air substantially upwardly and slightly forwardly (away from cab 11) through the radiator 40. Electric motor driven water pump 50 circulates conventional coolant through the engine 12 and the radiator 40 and receives cooled coolant from tank 46 via hose 52. Hose 54 conducts heated coolant from the engine 12 to upper tank 44.

The charge air cooling unit 60 is also located substantially above the engine 12 and to the rear of radiator 40. Cooling unit 60 includes a heat exchanger 62 between lower chamber 64 and upper chamber 66. Inlet pipe 63 communicates inlet air from turbo-compressor 33 to chamber 64. Outlet pipe 65 communicates cooled air from chamber 66 to engine intake manifold 37. A plurality (such as six) of electric motor driven fans 70 are attached to the underside of the cooling unit 60 substantially between the engine 12 and the cooling unit 60. Fans 70 are preferably driven to blow air substantially upwardly and slightly forwardly (away from cab 11) through the radiator cooling unit 60. It is advantageous to have the fans 48, 70 below rather than above the respective radiator 40 or 62 so that they operate in cooler, denser air.

Figure 6:
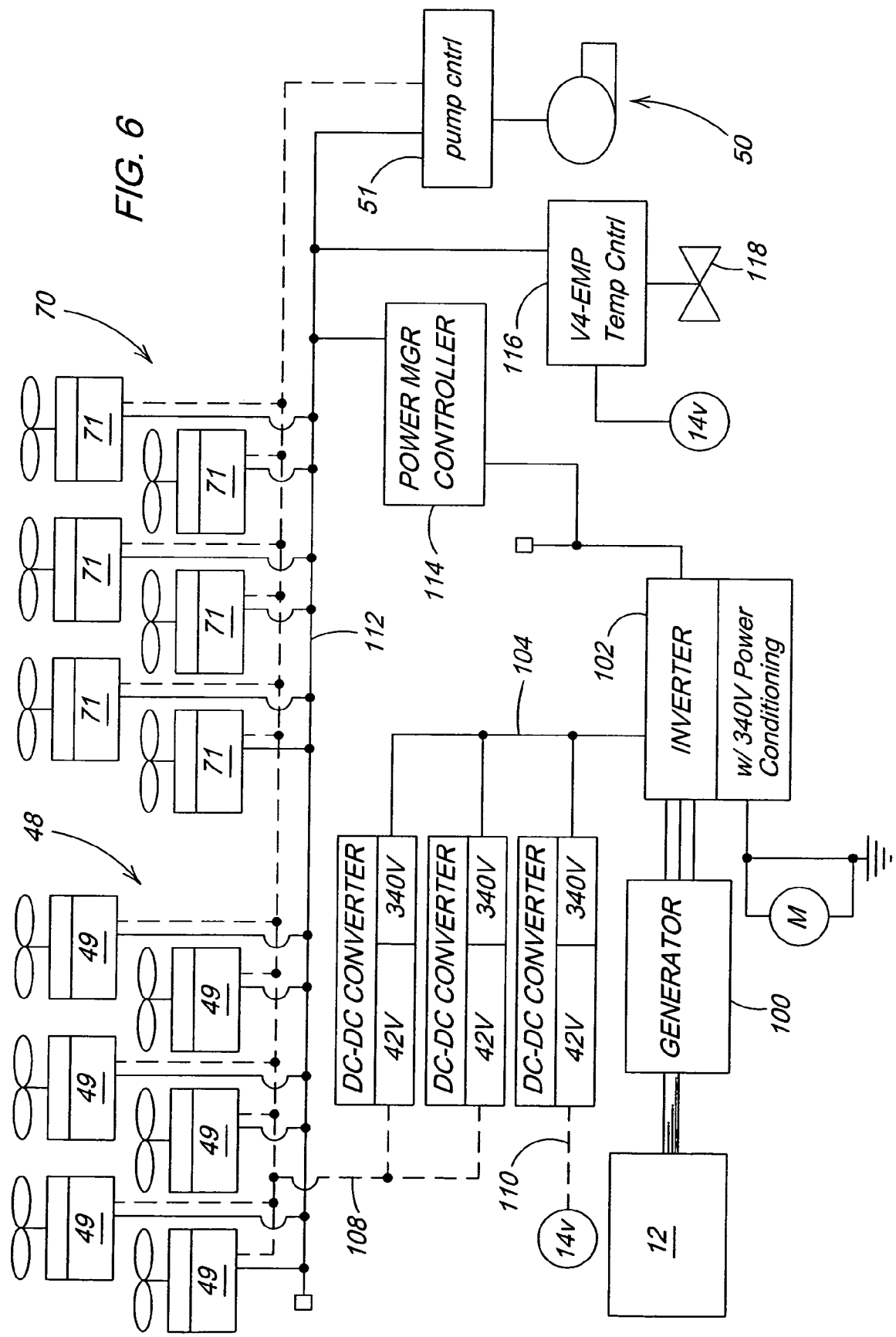
FIG. 6 is a simplified electrical schematic of the cooling system of the present invention.

Referring now to FIG. 6, an engine driven generator 100 provides electrical power to an inverter 102 which provides 340 volt DC electrical power to a 340 volt bus 104. DC—DC converters 106 receive the 340 volt DC electrical power and provides 42 volt DC power to a 42 volt bus 108 and 14 volt power to a 14 volt bus 110. Each fan 48 and 70 includes a respective electric motor/controller 49, 71 which receives power from bus 108. Each motor/controller 49, 71 also receives control signals via a conventional CAN (computer area network) bus 112. Bus 112 receives control signals from a power management control unit 114. Water pump 50 includes an electric motor/controller 51 which is connected to bus 108 and bus 112. A temperature control unit 116 is connected to bus 112 and to an engine thermostat 118. The power manager 114 may be programmed to control the number of fans 48, 70 which are in operation and to control the speed of the fans 48, 70 and the speed of water pump 50 in response to sensed conditions and operating parameters.

The result is a cooling system with a plurality of independent controllable electrically powered fans 48, 70 which are integrated with heat exchangers 42, 62, respectively, which are mounted horizontally above the engine 12. The fans 48 and 70 blow air in a vertical direction through large openings 22, 24 and 28 in the top of the hood 16. The fans 48, 70 and heat exchangers 42, 64 are mounted along the length of the hood 16. The radiator or engine cooler 40 is preferably mounted directly above and is solidly to the engine 12. An intercooler or EGR (exhaust gas recirculation) cooler (not shown) could be mounted adjacent to the turbocharger 33, reducing flow losses. Lower capacity AC and transmission coolers (not shown) can be mounted close to the cab (not shown) and the transmission 14.

This system reduces the size of the front end of the vehicle and improves forward visibility because there is no large centralized front-mounted fan and radiator system. The plurality of small controllable electric motor driven fans 48, 70 may be controlled to provide only the airflow needed for optimum cooling, thus increasing efficiency with respect to conventional tractor cooling systems. The hoses and plumbing to the heat exchangers 42, 62 is shorter and simplified because the heat exchangers are being mounted closer to the engine components they must be connected to.

The buoyant heated cooling air will rise naturally like air in a chimney, and this will reduce the power required by the fans 48, 70. By ejecting the heat vertically, tail wind induced recirculation and unintended cab heating are completely eliminated. Multiple small fans are quieter and provide more even flow through the radiator, resulting in better core utilization. By bringing the heated cooling air out the top of the hood 16, more openings in the hood are available to allow air to enter, thus reducing air velocities and the entrainment of debris. Preferably, the fans 49, 71 are reversible for self-cleaning purposes and thus work with gravity to dislodge debris attached to the underside of the heat exchanger units 42, 62. The engine may also get additional cooling due to the fact that cold air enters the engine compartment before passing through the radiator 40. Baffles and openings (not shown) can be formed in the hood 16 and used to control the cooling effect as needed.

While the present invention has been described in conjunction with a specific embodiment, it is understood that many alternatives, modifications and variations will be apparent to those skilled in the art in light of the foregoing description. For example, this invention could be applied to combines, forage harvesters, and some construction equipment. Accordingly, this invention is intended to embrace all such alternatives, modifications and variations which fall within the spirit and scope of the appended claims.

I claim:
1. In a non-rail off-road vehicle having an engine with a horizontally oriented rotation axis, a hood covering the engine and a cooling system, the improvement wherein the cooling system comprises:
   an engine cooling radiator, at least a portion of which is positioned directly above the engine and between the engine and the hood;
   a radiator fan unit for blowing air substantially upwardly through the radiator, the hood having an opening in an upper surface of the hood through which passes air blown by the fan unit;
   an engine charge air cooler positioned behind the engine cooling radiator, above the engine and between the engine and the hood; and
   a charge air cooler fan unit for blowing air upwardly through the charge air cooler, the hood having a plurality of openings in an upper surface of the hood through which passes air blown by the radiator fan unit and the charge air cooler fan unit.
2. The cooling system of claim 1, wherein:
   the fan unit is positioned below the radiator and between the engine and the radiator.
3. The cooling system of claim 1, wherein:
   the fan unit comprises a plurality of fans positioned between the engine and the radiator.
4. The cooling system of claim 1, wherein:
   an electrical generator is driven by the engine; and
   the fan unit includes an electric fan motor powered by the generator.
5. The cooling system of claim 1, wherein:
   the vehicle includes a cab, and the fan unit blows air upwardly and away from the cab.
6. In a non-rail off-road vehicle having an engine with a horizontally oriented rotation axis, a cab, a hood forward of the cab and covering the engine and a cooling system, the improvement wherein the cooling system comprises:
   an engine cooling radiator positioned above the engine and between the engine and the hood;
   a radiator fan unit for blowing air upwardly through the radiator;
   an engine charge air cooler positioned above the engine and between the engine and the hood and between the radiator and the cab;
   a charge air cooler fan unit for blowing air upwardly through the cooler, the hood having a plurality of openings in an upper surface of the hood through which passes air blown by the radiator fan unit and the charge air cooler fan unit.
7. The cooling system of claim 6, wherein:
   the radiator fan unit is positioned below the radiator and between the engine and the radiator; and
   the charge air cooler fan unit is positioned above the engine and between the engine and the charge air cooler.
8. The cooling system of claim 6, wherein:
   an electrical generator is driven by the engine; and
   both fan units include an electric fan motor powered by the generator.
9. The cooling system of claim 6, wherein:
   the fan units blow air upwardly and away from the cab.

* * * * *